United States Patent [19]

Capper

[11] Patent Number: 5,186,661
[45] Date of Patent: Feb. 16, 1993

[54] LID WITH INTEGRAL HINGES

[75] Inventor: Harry M. Capper, Harrisburg, Pa.

[73] Assignee: AMP Incorporated, Harrisburg, Pa.

[21] Appl. No.: 863,255

[22] Filed: Apr. 3, 1992

[51] Int. Cl.$^5$ .......................................... H01R 13/52
[52] U.S. Cl. ...................................... 439/718; 439/521
[58] Field of Search ............... 439/718, 367, 521, 522, 439/523, 135, 136, 142, 350, 353, 354, 367; 16/225, 231, 232

[56] References Cited

U.S. PATENT DOCUMENTS

| | | | |
|---|---|---|---|
| 2,439,708 | 4/1948 | Abraham | 439/142 |
| 2,870,933 | 1/1959 | Winter | 439/142 |
| 3,564,485 | 2/1971 | Cull et al. | 439/718 |
| 4,898,550 | 2/1990 | Ayer | 439/718 |

Primary Examiner—Eugene F. Desmond
Attorney, Agent, or Firm—Anton P. Ness

[57] ABSTRACT

A protector module (50) includes a housing (52) having cavities (58) into which are inserted electrical components such as surge protector elements (150). A lid (60) is securable to housing (52) by hinge tabs (196) having free ends (204) which are insertable through slots (200) in embossments along side surface (198) of housing (52). Latch surfaces (210) of free ends (204) latch beneath corresponding latch surfaces (212) of end walls of slots (200). Free ends (204) extend outwardly at right angles at bends (206) so that lid (60) can remain attached to the housing and retain a vertical orientation unassisted when opened permitting access to the inside of the housing (52).

4 Claims, 5 Drawing Sheets

LID WITH INTEGRAL HINGES

FIELD OF THE INVENTION

This relates to the field of articles having lids and more particularly to electrical junction boxes containing connections of service wires and telephone distribution cable.

BACKGROUND OF THE INVENTION

There are several commercially utilized connectors for providing interconnection between individual wires of service lines for customers to the main distribution cable of a telephone utility company in an enclosure or junction box, usually by means of an intermediate stub cable. The enclosure can be mounted in a ground level pedestal, or within a building, or mounted on an outside wall or a pole. Such enclosures which are for outdoor use must protect the connections from the environment, such as from precipitation, dust, insects, rodents and the like. One example of such an enclosure is sold by AMP Incorporated, Harrisburg, Pa. under Part No. 769164 as AMP Quiet Front Pole Mount Terminal, adapted for connection of up to 25 pairs of service wires. Another example of enclosure is also sold by AMP Incorporated, AMP Quiet Front Terminal Closure having Part No. 769147-1 for connection of up to six pairs.

One example of connector for mounting within enclosure is disclosed in U.S. Pat. No. 5,006,077 in which terminal blocks include silos within which are contained respective barrel terminals already terminated to conductors of the distribution cable and are apertured to receive ends of service wires inserted thereinto for termination thereto to define the electrical connection.

In several types of junction boxes for such connectors, overvoltage protector elements are provided on the circuits which protect the circuits of the customer's equipment from energy surges, such as from lightning strikes and the like. Several examples of such protectors are disclosed in U.S. Pat. Nos. 4,158,869; 4,161,762; and 4,133,019. Modules containing such protectors are disclosed in U.S. Pat. Nos. 4,742,541; 4,159,500; 4,613,732 and 4,675,778. The telecommunications industry has established standards for performance and certain dimensional and design requirements for such protectors; one example is Bellcore Technical Reference No. TR-TSY-000070, Issue 1, February, 1985, entitled "Customer Station Gas Tube Protector Units".

It is desired to provide a module containing an array of such protectors which can be assembled within an enclosure such that each protector is electrically connected in-line for the circuits interconnected by the terminals of the terminal block contained within the enclosure, upon termination of a service wire to a terminal.

It is further desired that such protector module be sealed against moisture.

It is also desired to provide such a protector module with an openable lid secured to the module's housing.

SUMMARY OF THE INVENTION

The present invention is a system of securing a lid onto a housing, such as for a module containing an array of protectors removably contained therein, where the module includes a housing of dielectric material defining protector-receiving cavities into which respective protectors are insertable. Such a protector module is disclosed in U.S. patent application Ser. No. 07/863,626 filed Apr. 3, 1992 and assigned to the assignee hereof.

The module includes a ground plate disposed across the upper face of the housing body to become electrically engaged with a ground electrode of each protector. At least a first contact is mounted proximate the bottom of each cavity and includes a first contact section exposed within the cavity for electrical engagement with a corresponding active electrode of a respective protector. The first contact includes a deflectable arm extending to an enlarged tab disposed transversely near the bottom of the cavity and slightly upwardly therefrom to be engaged by the active electrode protruding from the bottom of the protector establishing assured electrical engagement therebetween with the tab being deflectable downwardly toward the cavity bottom, which assures spring biased electrical engagement with the protector's active electrode. The contact is easily terminatable to an associated conductor wire of a stub cable to which the enclosure is being assembled and to a corresponding terminal for the circuit to be protected by the protector by having an end portion exposed along or extending from the bottom face of the module housing, defining a second contact section.

A lid of the housing is easily openable for access to the protectors for servicing, self-retains on the housing body upon being opened, and establishes a watertight seal with the housing body upon being closed. The lid is adapted to seal around the entire periphery of the housing body upon being closed, by including a resilient downwardly extending peripheral flange having inner and outer wall sections defining an upwardly extending channel therebetween canted outwardly. The peripheral flange is forcefittable over a corresponding upwardly and outwardly projecting lip around the upper edge of the side walls of the housing body forming a snug fit therewith.

The lid of the present invention is secured to the housing body by a pair of tabs extending downwardly along the outer side wall of the housing body and through slots of projecting ledge portions integrally molded with the housing body. The tabs have laterally extending latches along side edges thereof proximate the free ends having upwardly facing latch surfaces which prevent the tabs from being pulled upwardly through the ledges once inserted therethrough, retaining the lid to the housing body. The free ends of the tabs can also be molded to extend rearwardly at a right angle to the latches, enabling the lid to be lifted when opened until the free ends engage the bottom surfaces of the ledge portions so that the lid may be easily pivoted backwardly while still remaining secured to the housing body, freeing access to the protector array from interference. Outer edges of the tabs preferably are tapered at the free ends facilitating insertion through the slots during attachment of the lid.

It is an objective of the present invention to provide a module containing surge protective devices, with the module adapted to provide for interconnection with conductors of a stub cable and conductor lengths extending to terminals of a terminal block, defining a unitary assembly adapted for field connection of service wires to the stub cable in an enclosure.

It is also an objective for such a protector-containing module to accept commercially available protectors of several similar designs.

It is a further objective to provide effective sealing of such protector-containing module by providing an openable lid secured to a housing of the module in a manner permitting field replacement of the protectors, if necessary.

It is also an objective to provide a lid for a protector-containing module which is adapted to remain attached to the module after being opened, and remain opened in a position to provide clear access to the protector array during servicing.

It is additionally an objective for such lid to be an integrally molded article pivotably attachable to one side of the module housing at complementary securing means integral with the lid and with the housing respectively.

Embodiments of the present invention will now be discussed by way of example with reference to the accompanying drawings.

DETAILED DESCRIPTION OF THE PREFERRED EMBODIMENT

Figure 1:
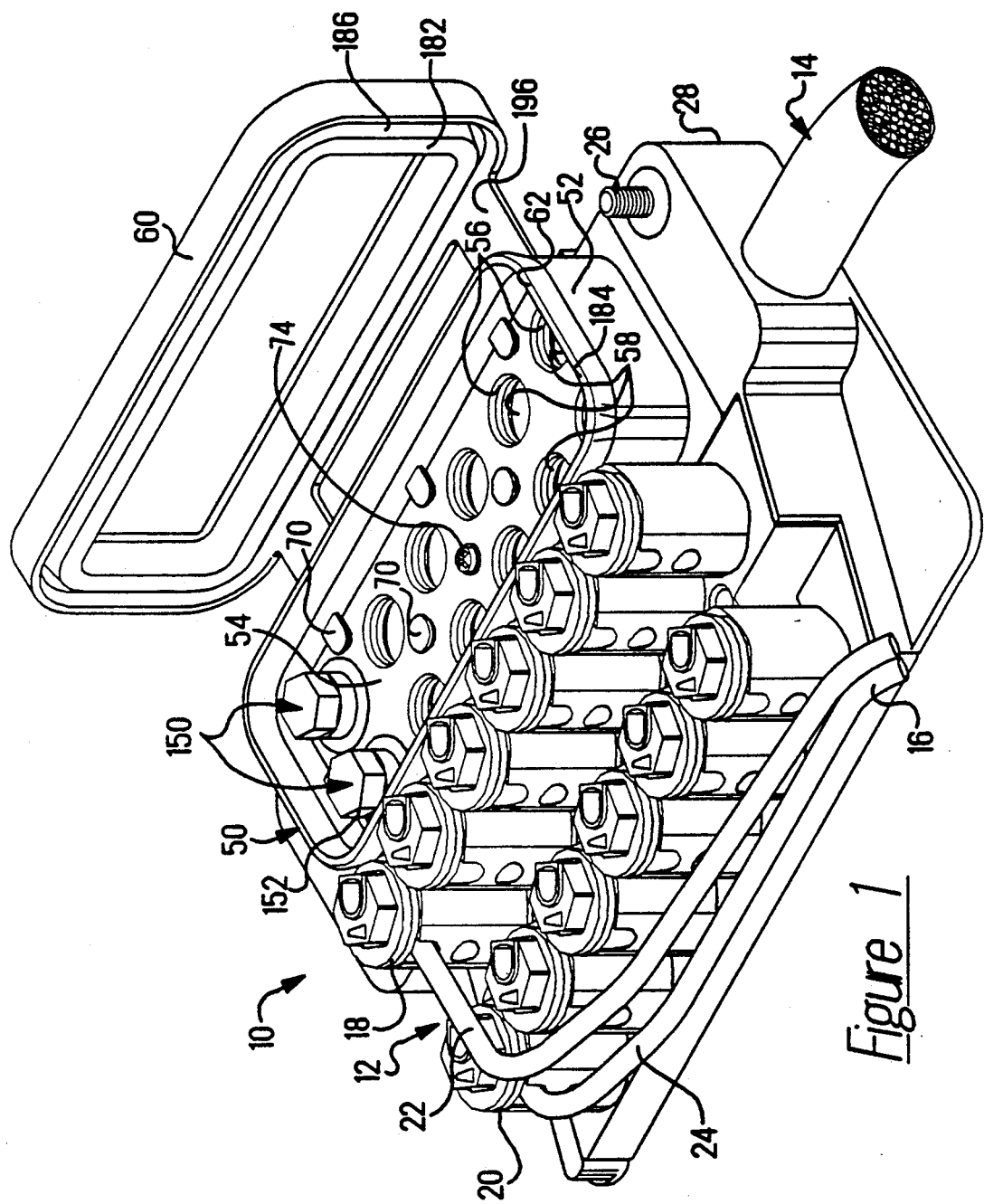
FIG. 1 is an isometric view of a protector module of the present invention assembled to a corresponding terminal block, with the lid of one shown open exposing several protectors in position, and a stub cable and representative customer line assembled thereto.
Figure 5:
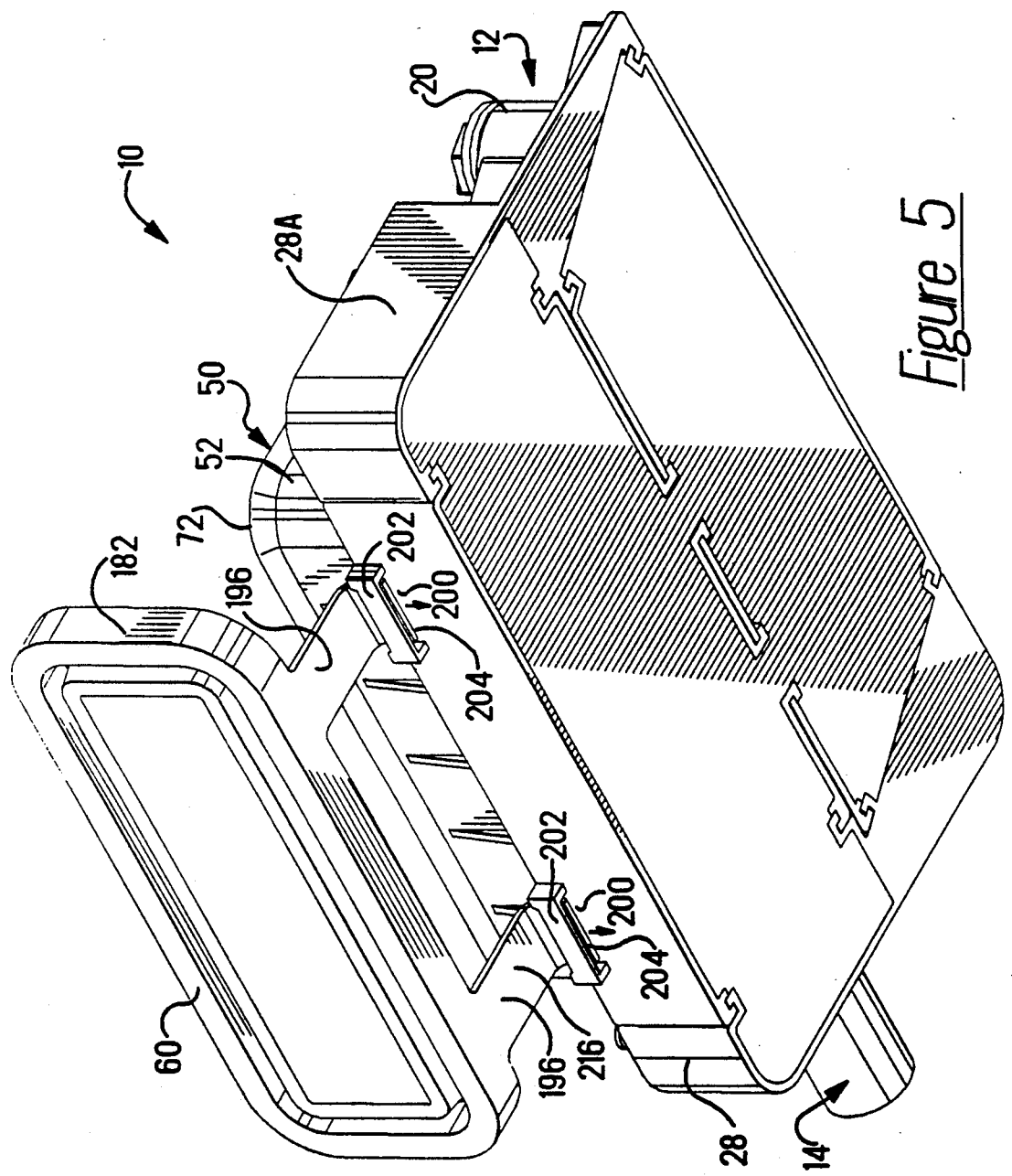

FIG. 1 is illustrative of a completed enclosure 10 containing a terminal block 12 within an enclosure housing, and a protector module 50 also assembled therewithin, all electrically connecting conductors of stub cable 14 to discrete customer lines such as representative line 16 to provide telephone service between a central office and the customers. Terminal block 12 includes a plurality of paired discrete housing sections 18,20 within which are disposed respective terminals interconnecting respective wires 22,24 of customer lines 16 with respective conductors of stub cable 14. One or more of customer lines 16 may be protected against voltage surges by protectors 150 contained within protector module 50 and electrically connected to the circuit comprising the customer line and the conductors of the stub cable. Protectors 150 are in grounding engagement with ground plate 54 secured across the top of dielectric housing 52 of protector module 50, and extend through respective holes 56 therethrough into cavities 58 of dielectric housing 52, with ground plate 54 being electrically connected to ground stud 26 mounted in an end cap 28 which is itself easily connected to ground by a ground wire (not shown). Terminations of stub cable conductor wires to contacts of the module along the bottom face of the module are preferably sealed by potting material as shown in FIG. 5.

Figure 2:
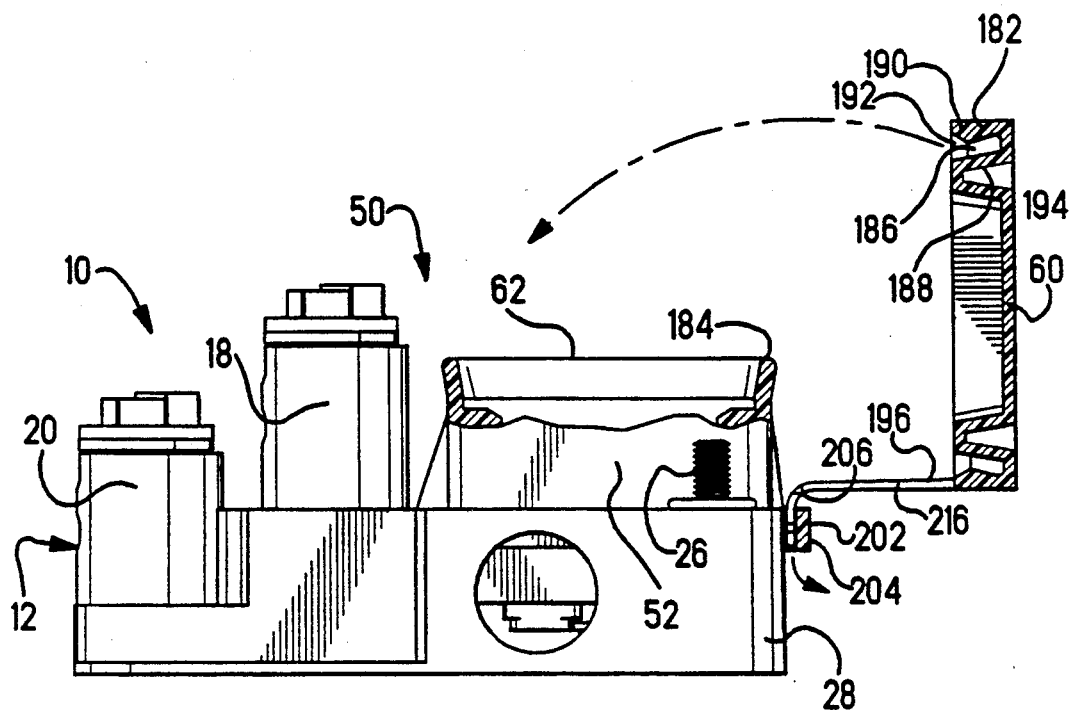
FIGS. 2 and 3 are partial cross-section views of the protector module showing the lid in open and closed positions respectively.
Figure 3:
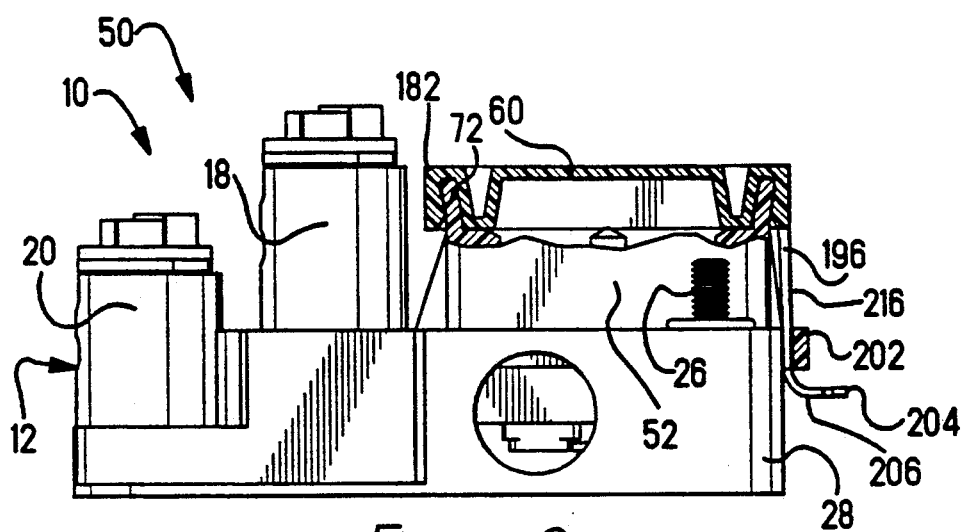
Figure 4:
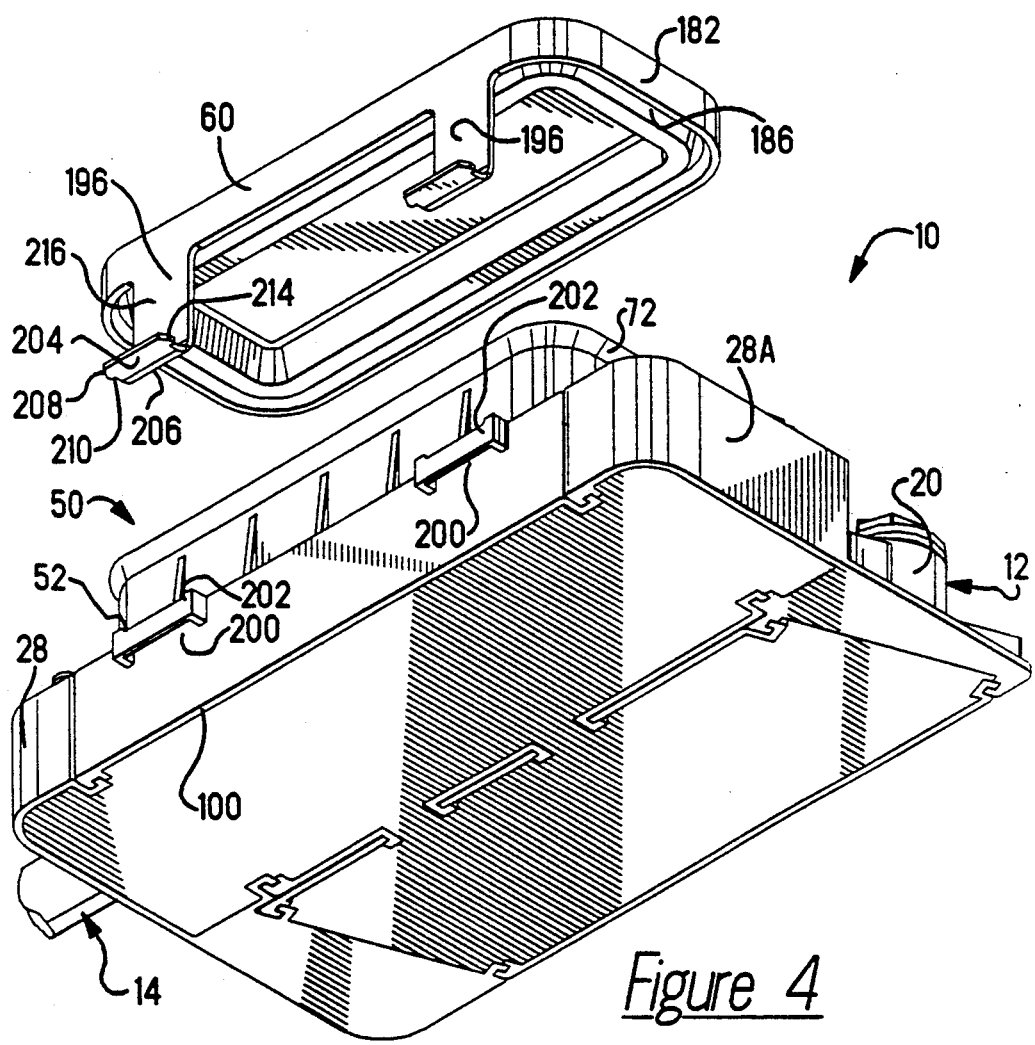
FIGS. 4 and 5 are isometric views from rearward and below the protector module housing body showing the lid being assembled thereto.

Sealing of the protector module from the environment is desired, and one system of sealing of lid 60 to housing 52 is disclosed in U.S. patent application Ser. No. 07/862,677 filed Apr. 3, 1992 and assigned to the assignee hereof. The top surface of module 50 is environmentally sealed by appropriate sealing fit of lid 60 to module housing 52 and protecting ground plate 54 and lugs 152 at the upper ends of protectors 150 in a manner which also permits lid 60 to be opened for access, as shown in FIGS. 2 and 3. Such a sealing fit is obtained as a result of the particular cooperating structures of the periphery 182 of lid 60 and wall section 62 of housing 52, with lid 60 comprised of resilient elastic material such as a copolyether elastomer as is sold by General Electric Company under the designation LOMOD FR5030A or optionally of a resilient plastic material, with housing 52 preferably composed of a relatively rigid plastic material such as a blend of acrylobutyl styrene and polyvinylchloride polymers.

Wall section 62 of housing 52 preferably is canted to extend slightly outwardly at an angle of between about 2° to about 15° such as about 10° to rounded edge surface 184. Periphery 182 of lid 60 preferably defines a lip having an edge-receiving channel 186 thereinto canted upwardly and outwardly at a similar angle of between about 2° to about 15° such as about 10° and thus is complementary to wall section 62 of housing 52, with the width of channel 186 being dimensioned to form a tight fit with wall section 62 when mated therewith. Channel 186 is defined between an angled inner wall 188 and an angled outer wall 190 parallel thereto, and preferably a leadin 192 at the channel entrance is provided assisting angled wall section 62 of housing 52 to enter canted channel 186 the center of which is otherwise offset slightly inwardly from the center of edge surface 184 of canted wall section 62, since the bottom 194 of channel 186 is vertically aligned with respect thereto substantially entirely peripherally around housing 52 thus being offset outwardly from the channel entrance. With lid 60 being made of resilient material, angled outer wall 190 is elastically deflectable outwardly as edge surface 184 enters canted channel 186, with deflection initiated by bearing engagement of rounded edge surface 184 with leadin 192, as lid 60 is closed onto housing 52 with moderate pressure easily manually applied. Also outer wall 190 may be angled toward inner wall 188 at the entrance to define a constriction narrower than the thickness of canted wall section 62 assuring tight engagement without inhibiting receipt of the upper edge into the channel.

Figure 6:
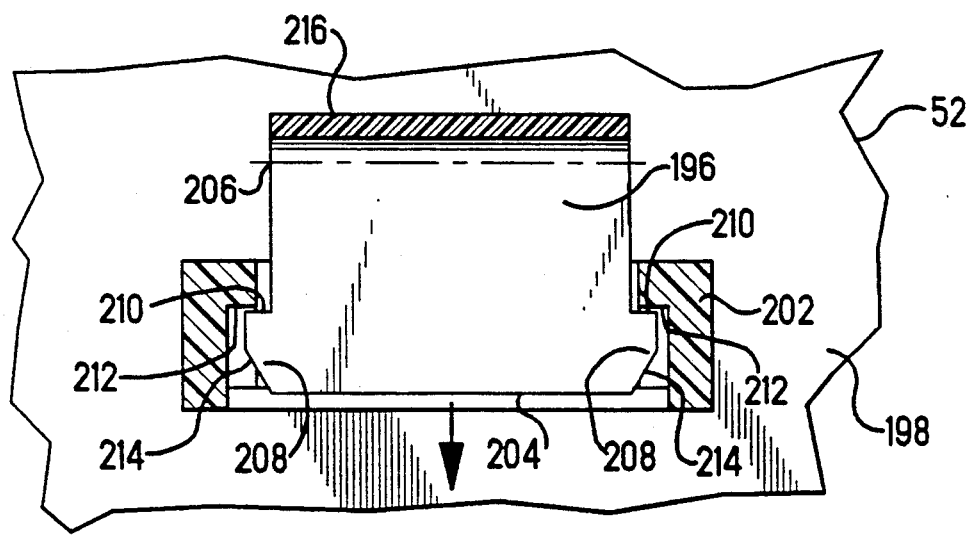
FIG. 6 is an enlarged view of a lid tab latched in a housing slot.

Referring to FIGS. 2 to 6, lid 60 includes a pair of hinge tabs 196 extending downwardly therefrom along rear surface 198 of housing 52 of protector module 50 and are inserted into corresponding vertical slots 200 formed through horizontal ledge sections 202 along rear surface 198. Hinge tabs 196 each preferably include a free end 204 extend around a right angle bend 206 with outwardly extending latching projections 208 defining latch surfaces 210 which are latchingly engageable with downwardly facing surfaces 212 of ledge sections 202 of housing 52. Hinge tab 196 is insertable into slot 200 from above, with angled outwardly facing surfaces 214 bearing against inside surfaces of ledge sections 202 at ends of slot 200, initiating elastic deformation of free ends 204 by reason of the resilient material from which lid 60 is made. After latch projections 208 pass below downwardly facing surfaces 212, free end 204 resumes its normal undeformed state and latch surfaces 210 opposed from downwardly facing surfaces 212 as shown in FIG. 6. Thereafter lid 60 remains attached to housing 52 even when opened.

Body sections 216 of hinge tabs 196 are of a length such that free ends 204 and bends 206 are disposed spaced from beneath slots 200 when lid 60 is closed onto housing 52. Bends 206 permit lid 60 to be rotated backwardly when fully opened as free ends 204 enter into slots 200 from below thereof but prevent hinge tabs 196 from being pulled completely upwardly through slots 200. The bends 206 preferably are at least a right angle and may be up to 180° to retain lid 60 in its rotated-back opened position clear of housing 52 allowing easy access to protectors therein, as illustrated in FIGS. 1 and 2.

The protector module of the present embodiment is adapted to be used with protector elements of any of several existing commercial designs which are in accordance with Bellcore specifications. The module is sealable against moisture, is programmable electrically in several manners, is easily used with a terminal block also modular to define a terminal block for protected circuits, and enables easy access to the protectors for service and repair. Variations and modifications may occur which are within the spirit of the invention and the scope of the claims.

I claim:

1. A module for containing an array of electrical components comprising a housing and a lid and adapted to receive respective ones of said electrical components, said lid having at least one hinge tab along an edge thereof and oriented parallel to said edge, each said hinge tab extending to a free end insertable into a corresponding at least one corresponding oriented slot defined through an elongate embossment along a corresponding side wall of said housing means for securing said lid to said housing, said free end including a pair of latch projections extending laterally from side edges thereof and parallel to said lid edge, each latch projection defining a rearwardly facing transverse latch surface latchable behind a corresponding oppositely facing latch surface defined along end walls of said corresponding slot upon insertion therethrough, and each latch projection including a tapered forwardly and outwardly facing bearing surface forwardly of said latch surface adapted to be deflected inwardly during passage through said slot by said end walls thereof.

2. The module as set forth in claim 1 wherein said free end of each said at least one hinge tab extends from a bend section at a substantial angle to a body section of said hing tab, and said body section of each said hinge tab having a length greater than a distance between said lid edge and said corresponding latch surfaces of said housing when said lid is closed onto said housing.

3. The module as set forth in claim 2 wherein said substantial angle at said bend section is at least a right angle.

4. The module as set forth in claim 1 wherein said lid includes two said hinge tabs along a common said edg thereof and said housing includes two said corresponding slots along a common said corresponding side wall thereof.

* * * * *